United States Patent
Blas, Jr. et al.

(10) Patent No.: US 9,128,917 B2
(45) Date of Patent: Sep. 8, 2015

(54) AUTOMATIC CONTENT EXPANSION INDICATORS

(75) Inventors: Joaquin C. Blas, Jr., Pacifica, CA (US); John Skidgel, Berkeley, CA (US)

(73) Assignee: Adobe Systems Incorporated, San Jose, CA (US)

( * ) Notice: Subject to any disclaimer, the term of this patent is extended or adjusted under 35 U.S.C. 154(b) by 2458 days.

(21) Appl. No.: 11/210,250

(22) Filed: Aug. 23, 2005

(65) Prior Publication Data

US 2014/0250362 A1    Sep. 4, 2014

(51) Int. Cl.
*G06F 9/44* (2006.01)
*G06F 17/22* (2006.01)
*G06F 3/0484* (2013.01)
*G06F 17/21* (2006.01)

(52) U.S. Cl.
CPC .......... *G06F 17/2247* (2013.01); *G06F 3/0484* (2013.01); *G06F 3/04842* (2013.01); *G06F 17/212* (2013.01)

(58) Field of Classification Search
None
See application file for complete search history.

(56) References Cited

U.S. PATENT DOCUMENTS

| | | | |
|---|---|---|---|
| 5,185,698 A | 2/1993 | Hesse et al. | |
| 5,442,742 A | 8/1995 | Greyson et al. | |
| 6,105,036 A | 8/2000 | Henckel | |
| 6,151,426 A | 11/2000 | Lee et al. | |
| 6,931,625 B1 * | 8/2005 | Coad et al. | 717/109 |
| 7,328,426 B2 | 2/2008 | Cosimo et al. | |
| 7,448,024 B2 | 11/2008 | Breeden et al. | |
| 2003/0131337 A1 | 7/2003 | Perumainar | |
| 2003/0145051 A1 | 7/2003 | Bates et al. | |
| 2003/0214538 A1 * | 11/2003 | Farrington et al. | 345/854 |
| 2004/0064791 A1 * | 4/2004 | Hattori et al. | 715/517 |
| 2004/0075699 A1 | 4/2004 | Franchi et al. | |
| 2004/0085367 A1 | 5/2004 | Hagarty, Jr. | |
| 2005/0044528 A1 | 2/2005 | Olsen | |
| 2005/0138540 A1 * | 6/2005 | Baltus et al. | 715/511 |
| 2006/0044597 A1 | 3/2006 | Dumitrescu et al. | |
| 2007/0283291 A1 | 12/2007 | Morris | |
| 2008/0092117 A1 | 4/2008 | Cosimo et al. | |

OTHER PUBLICATIONS

"Code Block Highlighter" Sep. 16, 2001, IBM Technical Disclosure Bulletin, Issue 449.*
Office Action of Apr. 29, 2009 in U.S. Appl. No. 11/209,335.
Office Action of Jul. 10, 2008 in U.S. Appl. No. 11/210,270.
Office Action of Jan. 7, 2009 in U.S. Appl. No. 11/210,270.
U.S. Appl. No. 11/209,335, filed Aug. 23, 2005.
Office Action dated Nov. 23, 2009 in related U.S. Appl. No. 11/209,335.
U.S. Appl. No. 11/210,270, filed Aug. 23, 2005.
Interview Summary dated Mar. 4, 2009 in related U.S. Appl. No. 11/210,270.
Examiner's Answer mailed Nov. 25, 2009 in related U.S. Appl. No. 11/210,270.
U.S. Appl. No. 11/500,023.
Office Action of May 11, 2010 in U.S. Appl. No. 11/500,023.

(Continued)

*Primary Examiner* — James D Rutten
(74) *Attorney, Agent, or Firm* — Kilpatrick Townsend & Stockton LLP

(57) ABSTRACT

A method, system, and computer program product for providing automatic expanding and collapsing of a portion of visual content on a screen including expanding the portion of visual content, and providing a visual cue alerting a user that the portion is automatically expanded from a collapsed state.

19 Claims, 6 Drawing Sheets

(56) References Cited

OTHER PUBLICATIONS

Examiner's Answer mailed Nov. 25, 2009 in U.S. Appl. No. 11/210,270.

Burkey and Sparkes, "Folding Editor—Comments Anyone?" Apr. 18, 1989, Usenet Post to group comp.sys.atari.st, Accessed via http://groups.google.com.

* cited by examiner

AUTOMATIC CONTENT EXPANSION INDICATORS

CROSS-REFERENCE TO RELATED APPLICATIONS

This application is related to U.S. patent application Ser. No. 11/209,335, filed Aug. 23, 2005, entitled CONTENT COLLAPSE OUTSIDE OF SELECTION and to U.S. patent application Ser. No. 11/210,270, filed Aug. 23, 2005, entitled MESSAGE CUES ASSOCIATED WITH CONTENT COLLAPSE INDICATORS, the disclosures of which are hereby incorporated herein by reference.

TECHNICAL FIELD

This invention generally relates to collapsed/expanded content in rendered views, and specifically relates to visual cues describing collapsed/expanded content in Integrated Development Environments (IDEs).

BACKGROUND OF THE INVENTION

Integrated Development Environments (IDEs) are software tools that allow a developer (e.g., a web developer) to create web pages, websites, interactive applications, and the like for use by end users (e.g., visitors to websites). Various IDEs exist in the current marketplace, such as DREAMWEAVER™, available from MACROMEDIA INC. of San Francisco, Calif. and FRONTPAGE®, available from Microsoft Corporation. DREAMWEAVER™ is an IDE that allows web developers to design Hypertext Markup Language (HTML) web pages in both a code editor and a graphical-based design time environment. DREAMWEAVER™ also allows the developer to design in other languages, such as, for example, Extensible Markup Language (XML), Extensible HTML (XHTML), Active Server Page (ASP), COLDFUSION™ Markup Language (CFML™), and the like.

An IDE may allow a developer to create a document in an environment that includes both a text-based code view and a graphical-based design view. The code view renders the source code as text in a portion of the screen and allows the developer to see and manipulate the source code in the document file. For example, the developer may write and edit HTML or Cascading Style Sheets (CSS) code in the code view. The design view, on the other hand, is a What You See Is What You Get (WYSIWYG) view of the document that allows the user to visually manipulate the interpreted and graphically laid-out version of the document, such as, for example, by dragging, dropping, cutting, and pasting visual components. As the developer works, changes to the document are reflected in both the code view and the design view.

Further, an IDE may support a code collapse feature. Code collapse, or code folding, in this example, is the ability to visually replace portions of the text in a document with an image or button, in effect hiding it, so that it does not take up much screen space. Users typically employ such a feature to hide portions of the code that they are not interested in or to bring two or more portions of the code closer together so that scrolling is not necessary to view them at the same time.

FIG. 1 is an illustration of example screen 100 from an IDE, including example code view 110. Code views, such as code view 110, are renderings of the source code as text for inspection, creation, and manipulation by the user. Example code view 110 is conceptual in that actual code is not shown thereon, but is understood to be represented by the word, "code." FIG. 2 is an illustration of example screen 200 from an IDE, including example code view 110. In screen 200, the user has selected code B 201. A user usually marks a region of source code (e.g., code 201) in code view 110 that he or she wants to collapse or hide. The marking may be performed by using a mouse or other pointing device to select code. The developer then indicates to the program that he or she desires to collapse selected code 201, for example, by clicking on widget 202 in the gutter area of code view 110. Internally, the program notates the region by dropping markers that capture the range that was selected—a marker at the beginning of the selection and a marker at the end of the selection. FIG. 3 is an illustration of example screen 300 from an IDE, including example code view 110. As shown in screen 300, when the IDE re-renders code view 110, it renders code collapse button 301 in the place of selected code 201.

Some IDEs also support an automatic code expand feature. In auto-expand, whenever a piece of collapsed code is selected, such as by the developer performing a FIND/REPLACE or selecting a corresponding visual object in the design view, the program automatically expands the collapsed code. When that piece of code is no longer selected, the program automatically recollapses the code.

When working in an IDE with code collapse and auto-expand, a developer may not realize that currently selected code is otherwise collapsed, and when the developer selects other code, it causes the auto-expanded code to recollapse unexpectedly. As a result, the developer may be distracted or lose his or her place in the code view. No IDEs that provide a code collapse feature with auto-expand provide a visual indication to the developer that certain code in the code view is auto-expanded from a collapsed state.

BRIEF SUMMARY OF THE INVENTION

The present invention, in one example, is directed to a system, method, and computer program that provide visual cues to the user indicating that a particular section of code has been auto-expanded, and is, therefore, otherwise collapsed. For example, the visual cues include vertical hash marks in the code view that show the vertical extent of the auto-expanded section. Other examples of visual cues include unique color highlighting, underlining, and the like, which may be applied to the particular auto-expanded code in the code view. An advantage of some embodiments is that the user is informed as he or she works with a section of code that that section is otherwise collapsed.

Further, it should also be noted that various embodiments of the invention are not limited to collapsing and expanding code in IDEs. Various embodiments may be applied to text editors, word processors, and the like, to indicate that text content has been auto-expanded. Still further, programs that collapse and expand other content (e.g., visual elements) may benefit from the indicators described herein.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawings, in which.

DETAILED DESCRIPTION OF THE INVENTION

Figure 1:
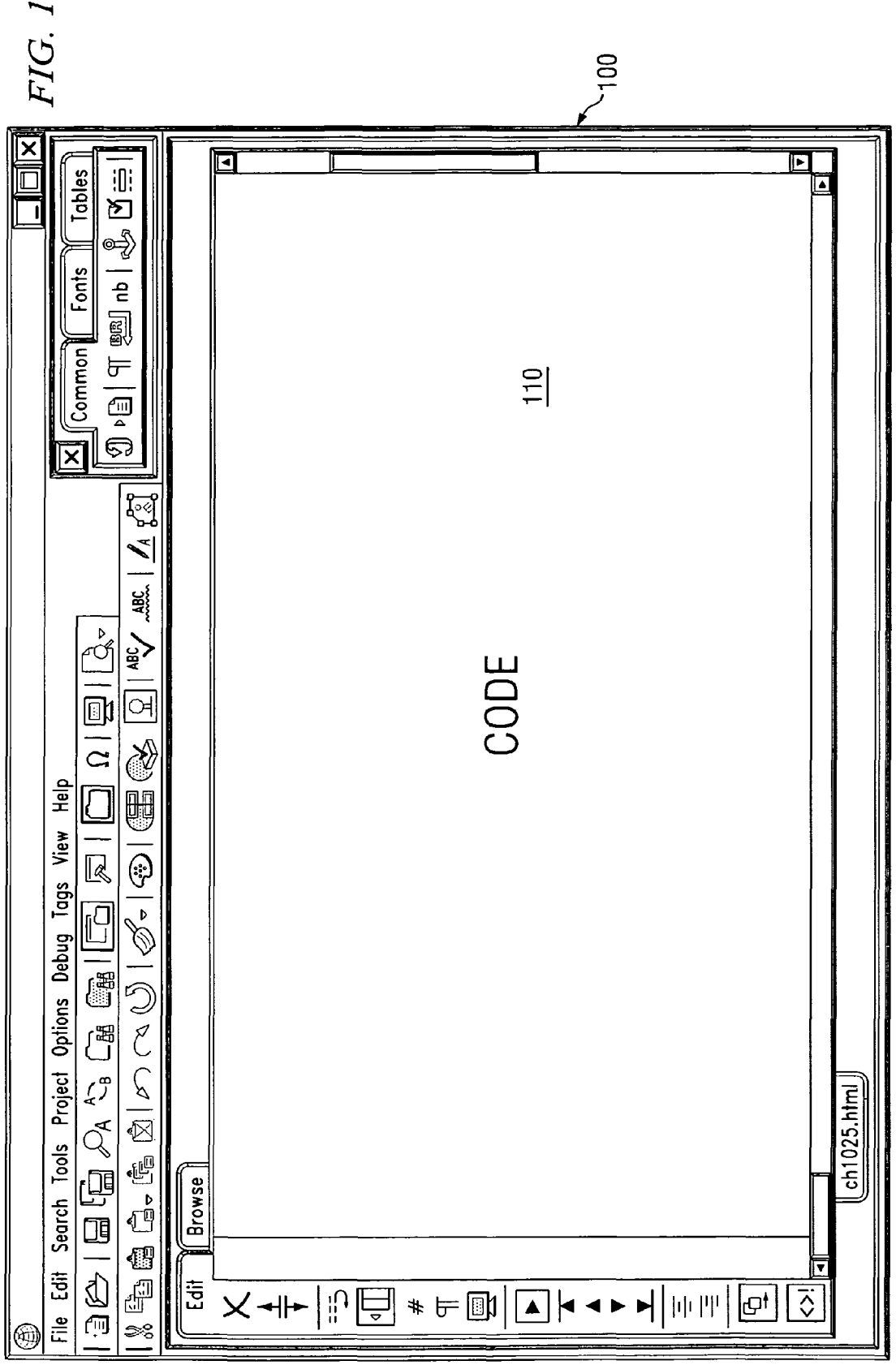
FIG. 1 is an illustration of an example screen from an IDE, including an example code view.
Figure 2:
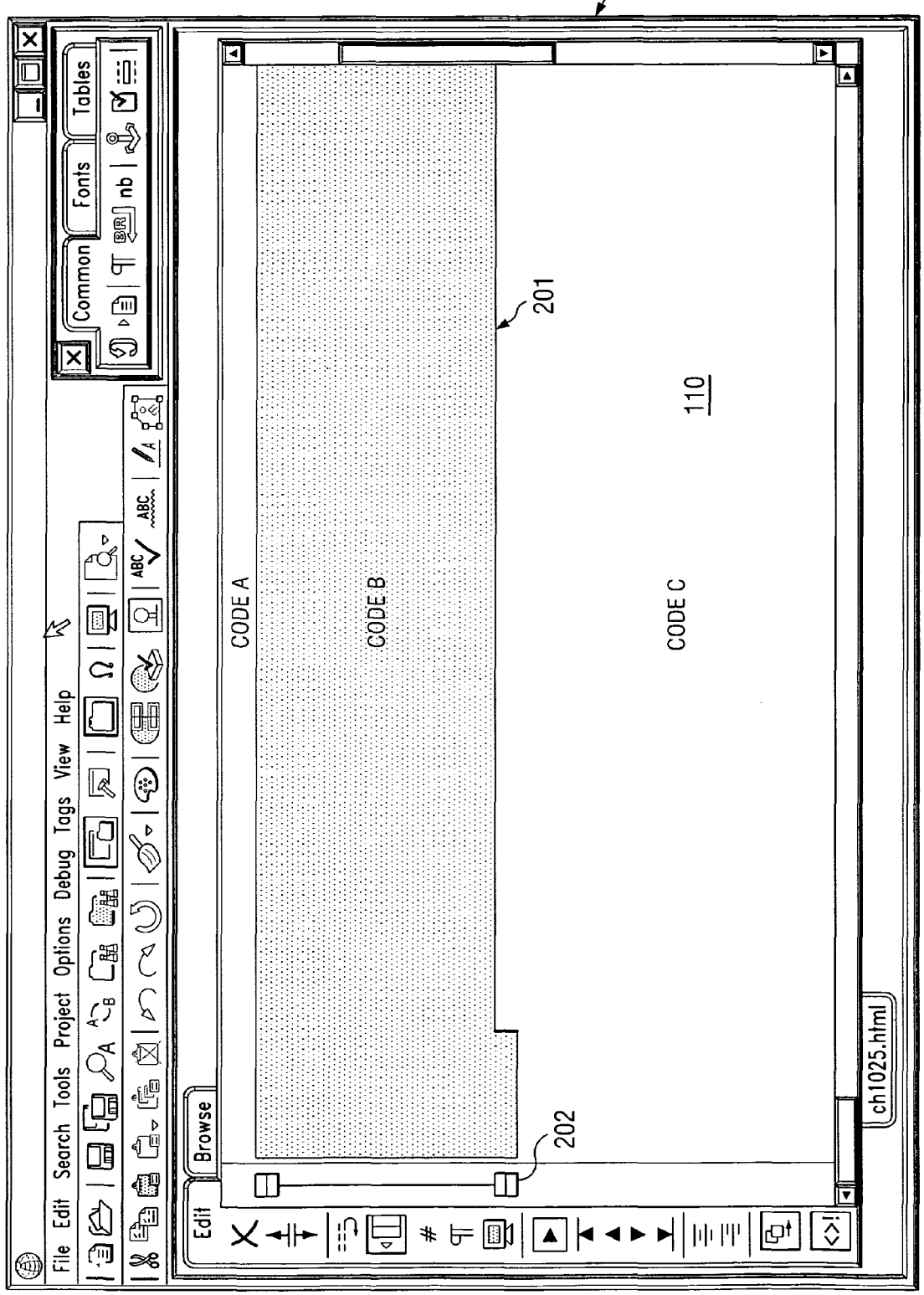
FIG. 2 is an illustration of an example screen from an IDE, including an example code view.
Figure 3:
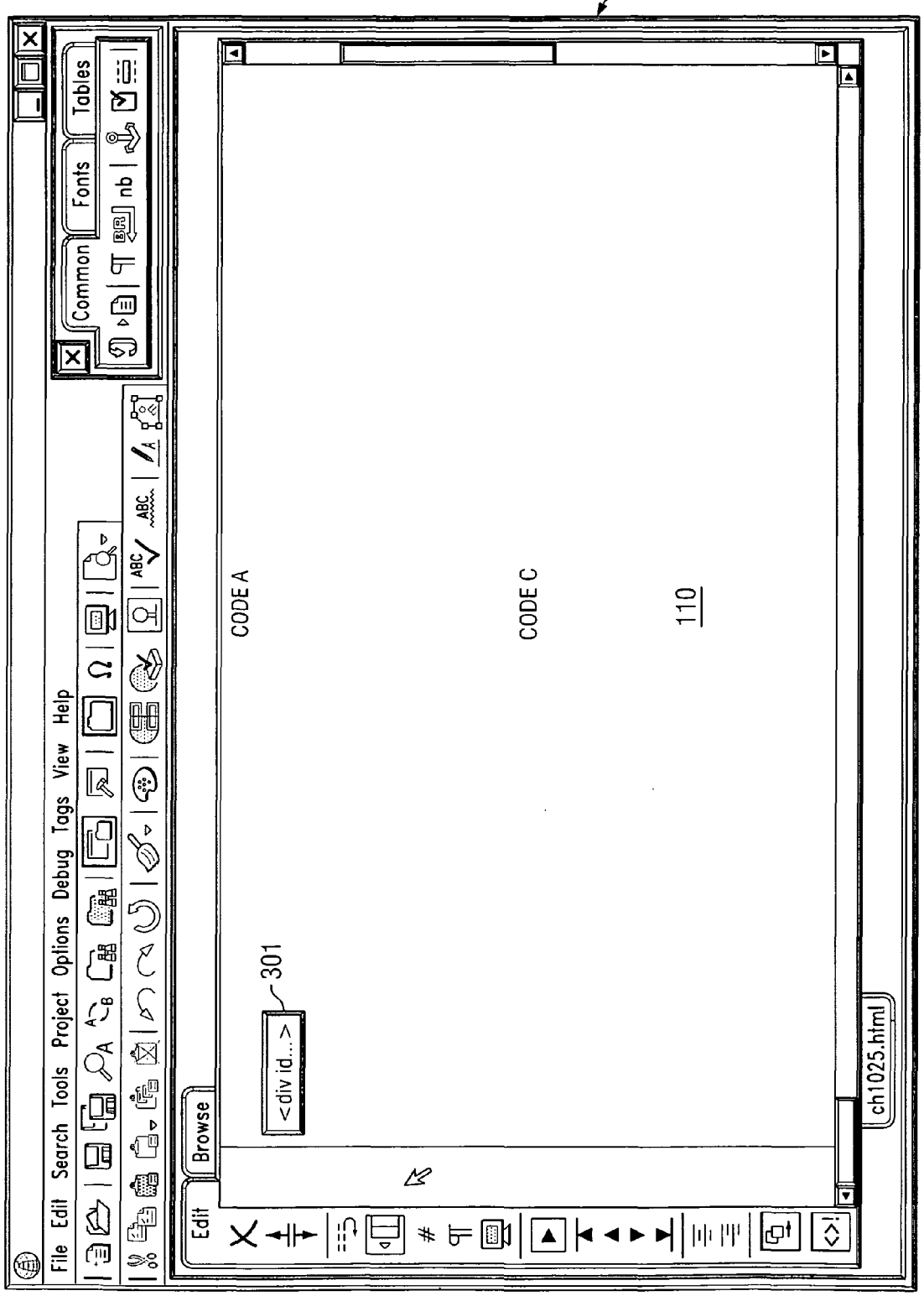
FIG. 3 is an illustration of an example screen from an IDE, including an example code view.
Figure 4:
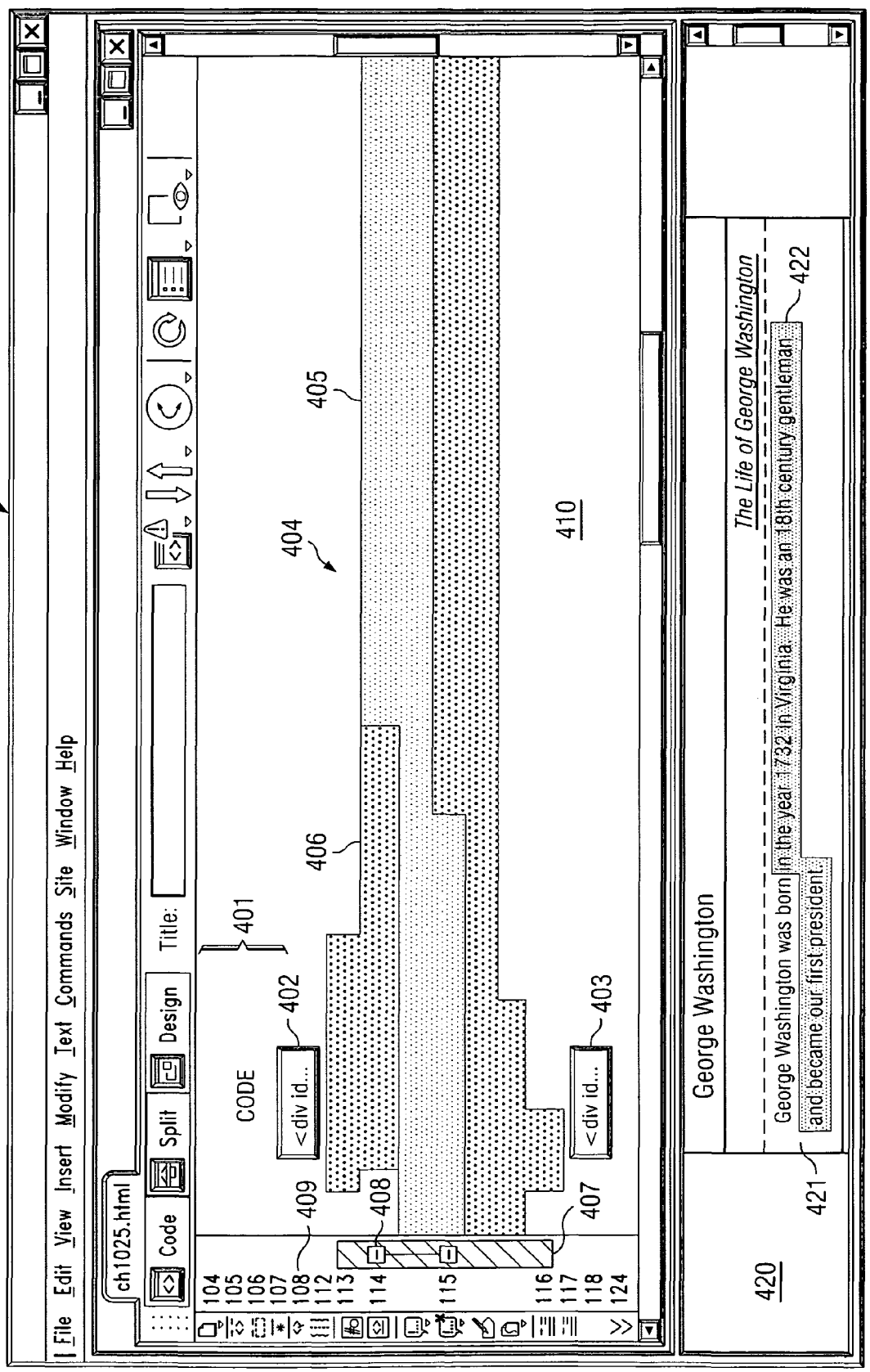
FIG. 4 is an illustration of an example screen of an IDE adapted according to one embodiment of the invention.

FIG. 4 is an illustration of example screen 400 of an IDE adapted according to one embodiment of the invention. Screen 400 is an example IDE screen (i.e., document window) that contains code view 410 and design view 420. Code view 410 is a view of the source code of a document rendered on the screen as text. Code view 410 includes source code 401 (replaced with "code") and source code 404 and source code 405, not shown as text in FIG. 4, but rather, represented by highlighting 406 so that the features of the invention may be more easily seen. It should be understood that the word, "code," and highlighting 406 indicate conceptually that source code should be rendered as text in that area of screen 400. Code 401 is not currently collapsed or auto-expanded. Code collapse buttons 402 and 403 represent code that is currently collapsed and not auto-expanded, such that it is currently hidden. Code 404 is auto-expanded code that is not hidden. However, because it may be subject to automatic collapse once another section is selected, it is momentarily not hidden, but otherwise designated as collapsed. Code 404 contains portion 405 that is currently selected, as shown by its different highlighting.

When a developer makes a selection in design view 420, the IDE shows which code is actually selected in code view 410. In FIG. 4, a developer has selected portion 422 of the visual representation of component 421. Note that the text in selection 422 corresponds to selected portion 405 in code view 410. A selected portion of code has two end points—a start end point and an end end point. When a selection is made, the program determines if either or both of the end points fall within a collapsed section of code. When an end point of a selection falls within a collapsed section of code, the IDE auto-expands the code in that particular code collapse button. For example, if a collapsed section of code contains a start end point, an end end point, or both, the IDE expands that section.

Code view 410 includes background coloring or highlighting 406 that is applied to code 404. Highlighting 406 is of a different color or pattern than any background color used with uncollapsed code. The unique coloring or patterning of highlighting 406 indicates to the user that code 404 is auto-expanded, but otherwise collapsed. In one or more embodiments, the highlighting of selected portion 405 may also be a unique color to indicate that it is a selected portion of an auto-expanded section. Highlighting 406 is one kind of visual indicator that code is auto-expanded from a collapsed state.

A second kind of visual indicator to identify code as auto-expanded is illustrated by hash marks 407 in the gutter area of code view 410. Hash marks 407 mark the vertical expanse of the auto-expanded lines. A developer can see immediately that code 404 from line 113 to line 116, inclusive, is auto-expanded code and is otherwise collapsed. Much like highlighting 406, hash marks 407 may be rendered in a color that indicates that code 404 is auto-expanded. Alternatively, hash marks 407, alone, may be sufficient to alert the developer to auto-expanded code.

Widgets 408 are not a visual indicator that code is auto-expanded, but rather, mark the extent of the selected portion. Widgets 408 are rendered whenever code is selected, not just when collapsed code is selected. The purpose of widgets 408 is to allow the developer to collapse the code by clicking thereon. In other words, by clicking the minus sign, a developer can designate code as collapsed and can even collapse code inside collapsed code.

Figure 5:
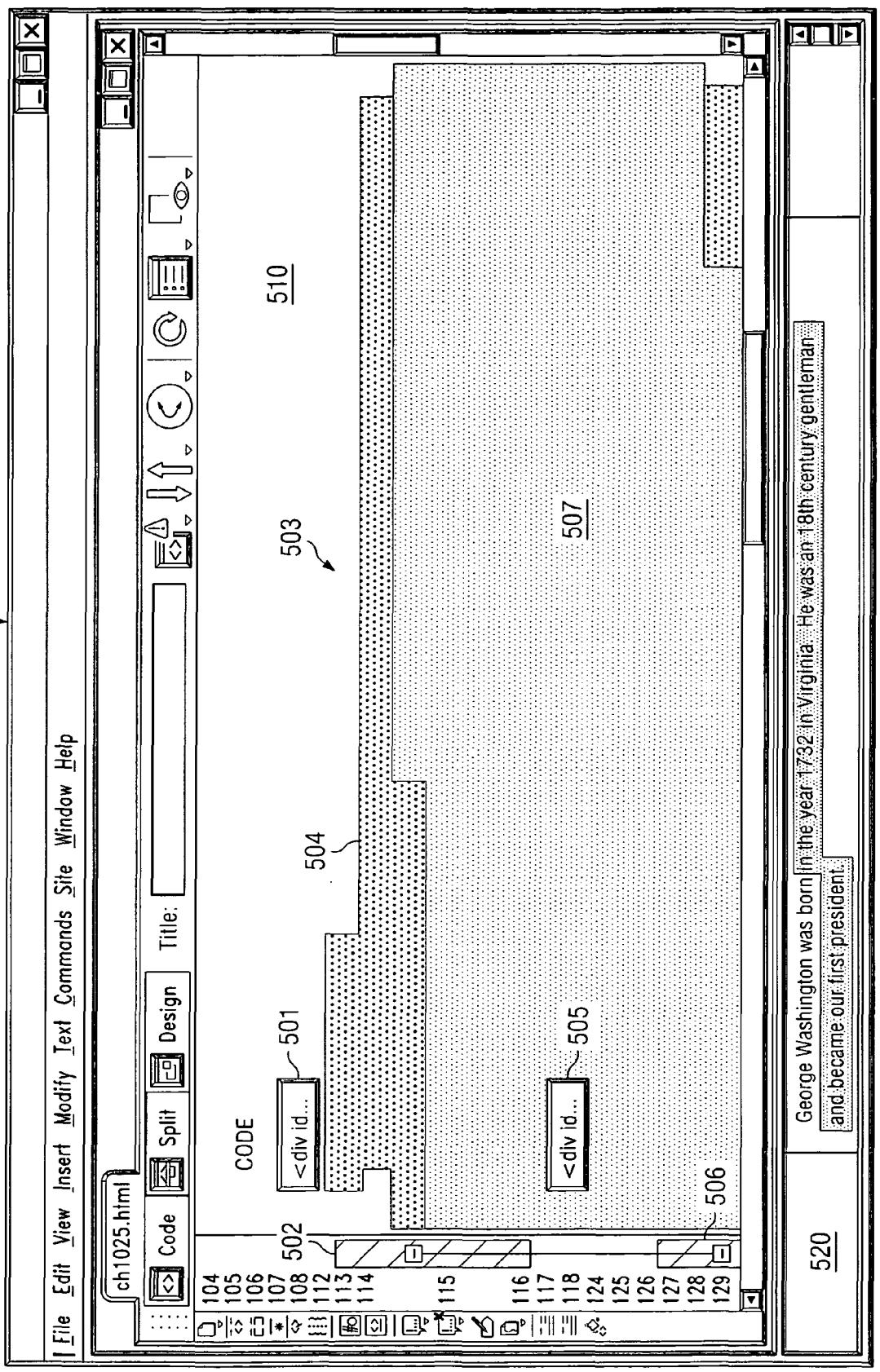
FIG. 5 is an illustration of an example screen of an IDE adapted according to one embodiment of the invention.

FIG. 5 is an illustration of example screen 500 of an IDE adapted according to one embodiment of the invention. Screen 500 includes code view 510 and design view 520. In the example of FIG. 4, the end points of the selected portions both lie in a single section of collapsed code; however, in the example illustrated in FIG. 5, end points of selected code 507 are each contained in two non-contiguous collapsed sections, each section denoted by visual indicators 502 and 506. The one-line gap between the bottom of indicator 502 and button 505 shows that uncollapsed code (not shown) is in line 117. Also, between the two non-contiguous collapsed sections exist intervening code collapse button 505 at line 118 and more uncollapsed code (not shown) at lines 124-126. The auto-expand function has, therefore, expanded the two non-contiguous collapsed sections denoted by indicators 502 and 506. Accordingly, auto-expanded code 503 is non-contiguous, as it reaches from line 113-116 and from line 127 to a point below the lower boundary of code view 510. Further, highlighting 504 is another visual indicator that code 503 is auto-expanded and is similar to highlighting 406 (FIG. 4), while visual indicators 502 and 506 are similar to hash marks 407 (FIG. 4).

It should be noted that the IDE of FIG. 5 does not auto-expand intervening collapsed code, such as that represented by button 505, because such code does not contain an end point of selected portion 507. However, alternative embodiments may expand intervening sections, as well as nested collapsed code (i.e., collapsed code within collapsed code, not shown). Accordingly, the present invention is not limited to particular methods of performing auto-expand.

Figure 6:
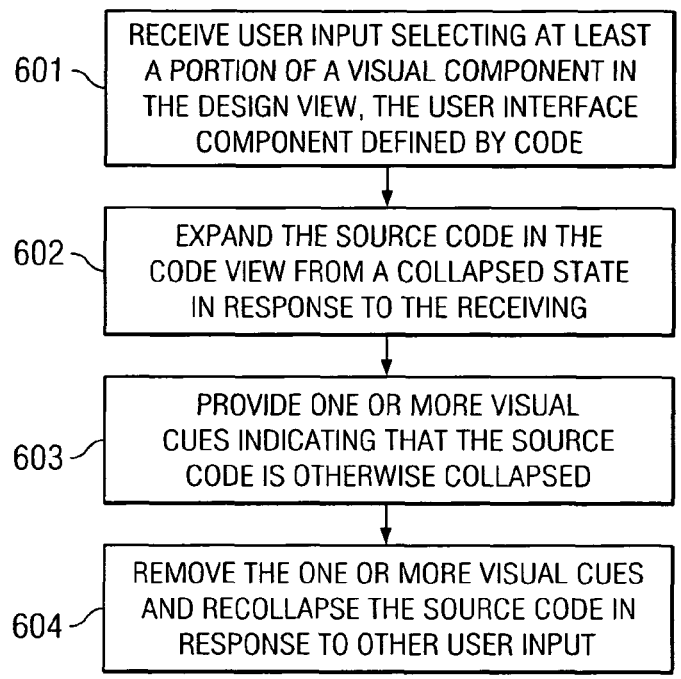
FIG. 6 is a flowchart illustrating an exemplary method, which may be performed by a computer system executing IDE software, the IDE providing a code view and a design view, the method adapted according to one embodiment of the invention.

FIG. 6 is a flowchart illustrating exemplary method 600, which may be performed by a computer system executing IDE software, the IDE providing a code view and a design view, the method adapted according to one embodiment of the invention. In step 601, the computer system receives user input selecting at least a portion of a visual component, the visual component defined by source code. Examples of receiving user input include receiving input from a mouse device selecting the portion in the design view and receiving user input initiating a FIND/REPLACE process in the source code that affects source code defining the visual object. The invention is not limited by the manner of receiving user input.

In step 602, the computer system expands the source code in the code view from a collapsed state in response to the receiving. In this step, the source code is collapsed, and the IDE receives the user input and auto-expands the source code, such that the source code is no longer hidden but is otherwise collapsed. Step 602, in this example, includes marking a beginning point and an ending point of the selected portion of the section in response to the user's selecting. Additionally, step 602 includes determining that one or more of the points is within the section of collapsed source code by comparing the points to the boundaries of one or more collapsed sections. Further, although the examples above include auto-expanding all of the code in a given collapsed section, the invention is not limited thereto, as alternate embodiments may expand only the selected portions of the collapsed sections while leaving unselected portions hidden.

In step 603, the computer system provides one or more cues indicating that the source code is otherwise collapsed. As shown in FIGS. 4 and 5, visual cues may include highlighting the auto-expanded code and marking the extent of the auto-expanded code with hash marks in a gutter area. Other visual cues may exist and are within the scope of the various embodiments. In fact, other non-visual cues, such as audio or Braille cues may be included in one or more embodiments of the invention.

In step 604, the computer system removes the one or more cues and recollapses the source code in response to other user input. The computer system performs step 604 by rendering the code view without the cues and with a code collapse button in place of the code. In one example, the IDE provides automatic collapse as well as auto-expand in the code view. In another example, the IDE receives manual input instructing that the code be re-hidden. The other user input may include, among other things, selecting another portion of source code or otherwise indicating that the code should no longer be expanded.

Various embodiments stand in contrast to IDEs that provide no visual indication to the developer that certain code in the code view is auto-expanded from a collapsed state. Example advantages include providing context to the user for the automatic functions of the IDE. Such context may help the user to identify expanded areas of the source code more quickly and with less effort, thereby providing a more enjoyable experience.

Some embodiments of the invention are not limited to IDEs. Thus, while the above examples are in the context of IDEs, various embodiments of the invention may be applied to other kinds of tools, as well. Other kinds of user programs that show text on a screen, e.g., word processors and text editors, may use the collapse and automatic collapse indicators described above. In fact, source code is only one type of text, and various embodiments may be applied to code, rendered portions of text content, raw text, and the like. For instance, a long document may benefit from a text collapse feature that hides text that is not of interest, and automatic text collapse indicators may be used to mark text that is auto-expanded, for instance, during a FIND/REPLACE operation. Thus, a program that loads the contents of a document file, interprets the contents, and renders a representation of it to a user may benefit from the invention. In fact, various embodiments apply to IDEs and other tools that create documents in general, as well as tools that create interactive applications.

Other types of content may be collapsed and expanded, and, therefore, may find application in some embodiments. For instance, the collapse feature can be extended to operate on visual elements in a design view, for example, by hiding the contents of a table or paragraph. Accordingly, cues can be used to indicate that some visual content has been auto-expanded. Examples of possible cues include highlighting, hash marks, unique color renderings, and the like.

When implemented via computer-executable instructions, various elements of embodiments of the present invention are in essence the software code defining the operations of such various elements. The executable instructions or software code may be obtained from a readable medium (e.g., a hard drive media, optical media, EPROM, EEPROM, tape media, cartridge media, flash memory, ROM, memory stick, and/or the like) or communicated via a data signal from a communication medium (e.g., the Internet). In fact, readable media can include any medium that can store or transfer information.

Figure 7:
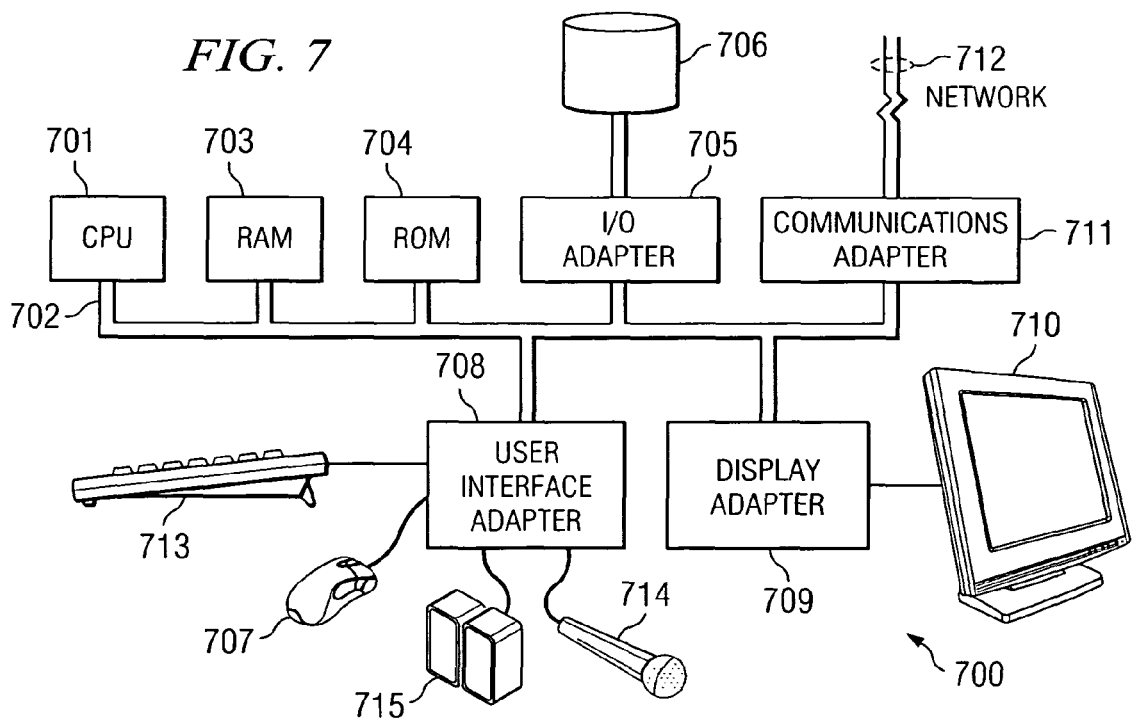
FIG. 7 illustrates an example computer system adapted according to embodiments of the present invention.

FIG. 7 illustrates example computer system 700 adapted according to embodiments of the present invention. That is, computer system 700 comprises an example system on which embodiments of the present invention may be implemented. Central processing unit (CPU) 701 is coupled to system bus 702. CPU 701 may be any general purpose CPU. However, the present invention is not restricted by the architecture of CPU 701 as long as CPU 701 supports the inventive operations as described herein. CPU 701 may execute the various logical instructions according to embodiments of the present invention. For example, CPU 701 may execute machine-level instructions according to the exemplary operational flows described above in conjunction with FIG. 6.

Computer system 700 also preferably includes random access memory (RAM) 703, which may be SRAM, DRAM, SDRAM, or the like. Computer system 700 preferably includes read-only memory (ROM) 704 which may be PROM, EPROM, EEPROM, or the like. RAM 703 and ROM 704 hold user and system data and programs, as is well known in the art.

Computer system 700 also preferably includes input/output (I/O) adapter 705, communications adapter 711, user interface adapter 708, and display adapter 709. I/O adapter 705, user interface adapter 708, and/or communications adapter 711 may, in certain embodiments, enable a user to interact with computer system 700 in order to input information, such as, for example, selecting a portion of code or a visual representation of a component.

I/O adapter 705 preferably connects to storage device(s) 706, such as one or more of hard drive, compact disc (CD) drive, floppy disk drive, tape drive, etc. to computer system 700. The storage devices may be utilized when RAM 703 is insufficient for the memory requirements associated with storing data for program 703. Communications adapter 711 is preferably adapted to couple computer system 700 to network 712 (e.g., the Internet). User interface adapter 708 couples user input devices, such as keyboard 713, pointing device 707, and microphone 714 and/or output devices, such as speaker(s) 715 to computer system 700. Display adapter 709 is driven by CPU 701 to control the display on display device 710 to, for example, display the code view and design views (as in FIGS. 4-5) of embodiments of the present invention.

It shall be appreciated that the present invention is not limited to the architecture of system 700. For example, any suitable processor-based device may be utilized, including without limitation personal computers, laptop computers, computer workstations, and multi-processor servers. Moreover, embodiments of the present invention may be implemented on application specific integrated circuits (ASICs) or very large scale integrated (VLSI) circuits. In fact, persons of ordinary skill in the art may utilize any number of suitable structures capable of executing logical operations according to the embodiments of the present invention.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for providing automatic expanding and collapsing of a portion of visual content on a screen, said method comprising:
   providing, by a computing system, an interface displaying visual content, wherein at least some of the visual content is represented in a collapsed state, wherein the interface supports an expand command to expand content represented in a collapsed state, a collapse command to collapse content represented in an expanded state, and at least one selection command which, in response to input identifying content of interest, searches for the content of interest and automatically expands content represented in the collapsed state if the content represented in the collapsed state comprises the content of interest, the selection command invocable independently from the expand or collapse command;
   receiving, by the computing system, input invoking the selection command and identifying content of interest;
   determining, by the computing system that the content of interest is included in a portion of the content that is represented in the collapsed state;
   automatically expanding, by the computing system, said portion of the visual content; and
   providing, by the computing system, output to display a visual cue on a display device, the visual cue associated with the portion that was automatically expanded and configured to indicate that said portion was automatically expanded from a collapsed state in response to invoking the selection command,
   wherein the visual cue distinguishes said automatically expanded portion from other content represented in the expanded state alongside the automatically-expanded portion, and wherein the other content represented in the expanded state is expanded in response to an event other than the input invoking the selection command and identifying the content of interest.

2. The method of claim 1 wherein the visual content comprises text, source code, or a visual element.

3. The method of claim 1 wherein said visual cue comprises at least one of hash marks in a gutter of a code view indicating lines containing expanded collapsed code or highlighting expanded collapsed code.

4. The method of claim 1 wherein said expanding includes expanding nested collapsed sections of said visual content.

5. The method of claim 1 wherein said method is performed by one of: an Integrated Development Environment (IDE); a word processing program; or a text editor.

6. The method of claim 1 further comprising recollapsing said portion and removing said visual cue.

7. A method for providing an Integrated Development Environment (IDE), said IDE including a code view depicting source code content and a design view depicting a graphically laid-out version of a document defined by source code in the code view, said method comprising:
   receiving user input selecting at least a portion of visual representation of a component in said design view, said component defined by source code in said code view;
   expanding a section of said source code in said code view from a collapsed state in response to said receiving;
   providing one or more visual cues indicating that said section of said source code defines said component and was expanded in response to said user input in said design view selecting said portion of said visual representation of said component; and
   removing said one or more visual cues and recollapsing said section of said source code.

8. The method of claim 7 wherein said expanding said section of said source code in said code view comprises:
   marking a beginning point and an ending point of a portion of said source code corresponding to said at least a portion of said visual representation of said component; and
   determining that one or more of said points is within said section of said source code.

9. The method of claim 7, wherein said removing said one or more visual cues and recollapsing said section of said source code is in response to receiving user input in said design view removing selection of said portion of said visual representation of said component.

10. The method of claim 7, wherein said removing said one or more visual cues and recollapsing said section of said source code is in response to receiving user input in said design view selecting at least a portion of visual representation of a different component in said design view, said different component defined by different source code in said code view.

11. A method for providing automatic expanding and collapsing of portions of visual display, said method comprising:
   providing, by a computing system, a code view depicting source code content and a design view rendering a graphic layout of elements defined by the source code, at least a first portion of the source code content represented in a collapsed state in the code view and at least a second portion of the source code content represented in an expanded state;
   automatically expanding the first portion of the source code content represented in the collapsed state in response to user input identifying an element rendered in the design view and defined by source code included in the portion;
   providing indicators in the code view that the first portion is automatically expanded from a collapsed state, the indicators distinguishing the automatically expanded first portion from the second portion, wherein the second portion is expanded in response to an event other than the user input identifying the element rendered in the design view; and recollapsing said first portion and removing said indicators from said screen in response to further user input.

12. The method set forth in claim 11, wherein the indicators comprise at least one of hash marks in a gutter of said code view indicating lines of code defining the identified element and a change in the appearance of lines of code defining the identified element.

13. The method set forth in claim 11, wherein the code comprises source code defining a word processing document, a Hypertext Markup Language (HTML) document, or a Rich Internet Application (RIA).

14. A computer program product comprising a non-transitory computer readable medium embodying program code, the computer program product comprising:

program code for providing a first interface and displaying content in the first interface, the first interface supporting an expand command to expand content represented in a collapsed state and a collapse command to collapse content represented in an expanded state;

program code for collapsing at least a portion of the content in response to the collapse command and rendering a collapse indicator in place of the collapsed content in the first interface, the collapse indicator rendered alongside other content represented in the expanded state;

program code for providing a second interface and receiving a selection command identifying content of interest via the second interface;

program code for determining, in response to the selection command, if the content of interest is included in the collapsed content; and program code for expanding at least the portion of collapsed content including the content of interest and providing an indicator, the indicator visually distinguishing the portion that has been automatically expanded from a collapsed state in response to the selection command from the other content represented in the expanded state, wherein the other content represented in the expanded state is expanded in response to an event other than the selection command.

15. The computer program product set forth in claim 14, wherein the second interface comprises a search interface configured to receive one or more search terms identifying the content of interest.

16. The computer program product set forth in claim 15, further comprising:

program code for identifying when use of the search interface is complete; and program code for re-collapsing the expanded portion of the content after use of the search interface is complete.

17. The computer program product set forth in claim 14, wherein content in the first interface comprises source code and the second interface comprises a design view rendering elements defined by the source code in the first interface, wherein the selection command identifying content of interest comprises selection of one or more elements rendered in the second interface.

18. The computer program product set forth in claim 17, further comprising:

program code for re-collapsing the expanded portion of the content after the selected one or more elements are de-selected.

19. The computer program product set forth in claim 14, wherein the visual indicator visually distinguishes the portion that has been automatically expanded by using at least one of:

a color or highlighting different from a color or highlighting associated with the other content already represented in the expanded state; or hash marks different from hash marks or annotations associated with the other content already represented in the expanded state.

* * * * *